March 6, 1945.  O. A. WIRKKALA  2,371,009
CARGO HANDLING RIGGING
Filed Oct. 11, 1943  2 Sheets-Sheet 2
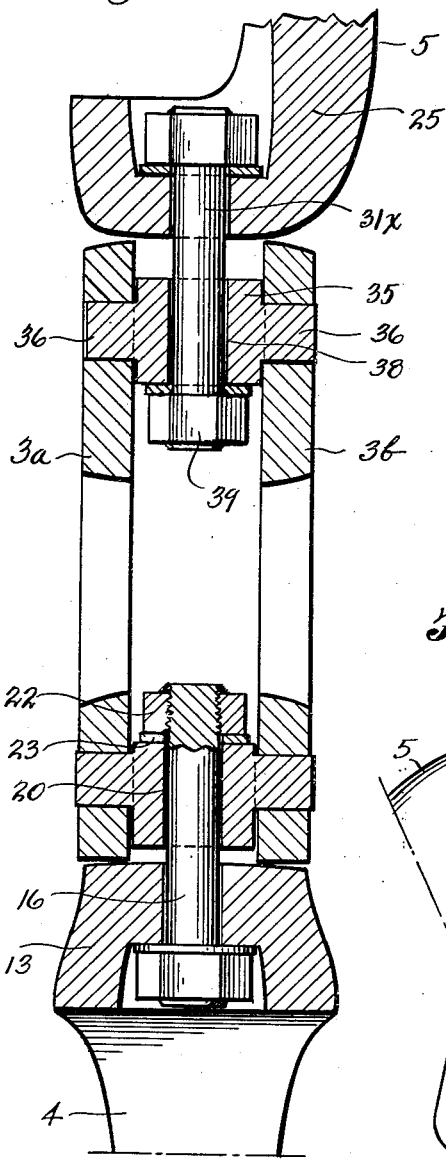
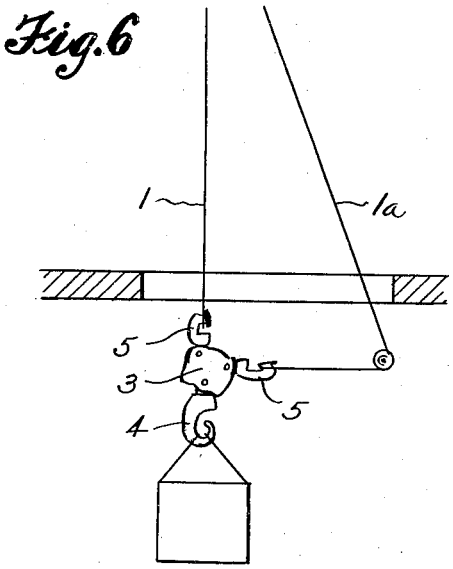
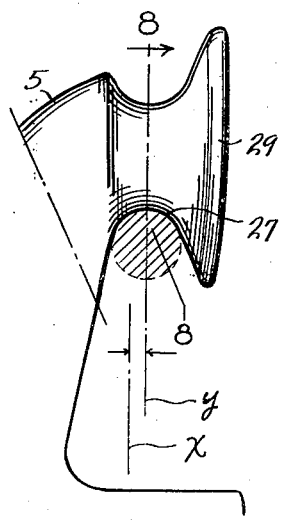
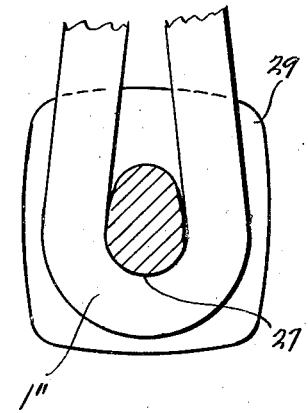
INVENTOR
OSCAR A. WIRKKALA
BY
Cook & Robinson
ATTORNEY Patented Mar. 6, 1945

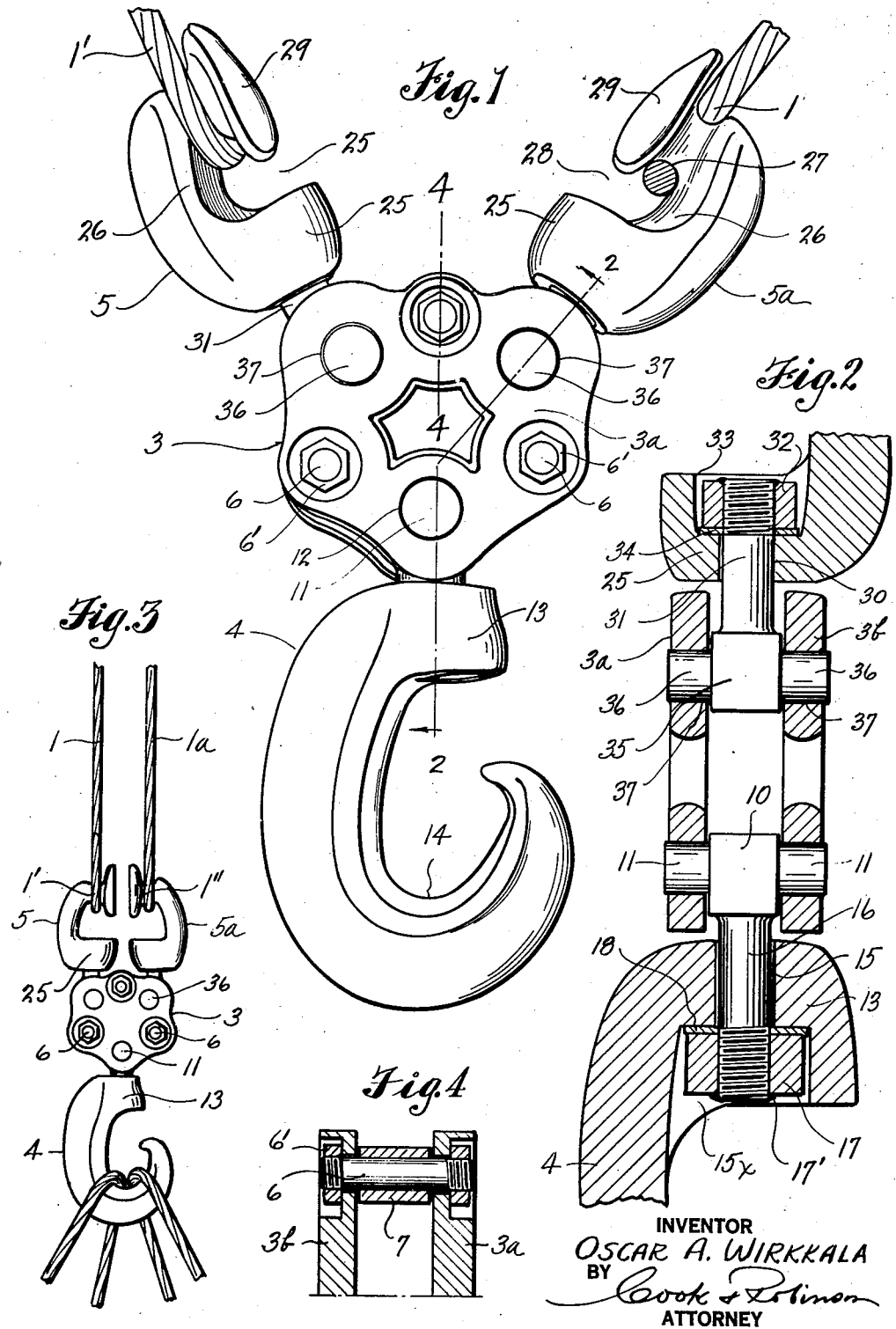

2,371,009

UNITED STATES PATENT OFFICE 2,371,009

CARGO HANDLING RIGGING

Oscar A. Wirkkala, Seattle, Wash.

Application October 11, 1943, Serial No. 505,738

6 Claims. (Cl. 294—78)

This invention relates to improvements in cargo handling rigging. More particularly, it relates to improvements in cargo hook and shackle assemblies designed for use with two hoisting lines after the fashion now practised on ships for the transferring of cargo from ship to dock, or vice versa; such an assembly being characterized by its use of a cargo hook that is swively suspended from an equalizer block to which the ends of the two hoisting lines are connected through the mediacy of pinless shackles.

It is the principal object of this invention to provide an improved cargo handling rigging, especially designed for use in combination with two hoist lines, featuring a free swiveling cargo hook of an improved form, an equalizer block from which the hook is pivotally suspended, and a pair of short coupled, pinless shackles individually pivotally connected to the equalizer and formed with cable seats to which the looped ends, or eye splices of the hoisting lines are functionally applied; it being a feature of this shackle that the cable loops may be easily applied and readily removed therefrom when the lines are slack, but they cannot be disconnected therefrom so long as the lines are taut or under normal holding strain.

Another object is to so design the cable seats in the shackles that the cables will not be flattened or be subject to kinking and excessive wear under heavy load, but will be held in their rounded condition.

Another object of the invention is to provide a hook, equalizer and shackle assembly that is materially reduced both in weight and in its overall dimensions with respect to equipment now generally used, and without detriment to strength or utility; this being by reason of the novel design of the parts and their relationship, as well as by reason of the fact that the structure avoids use of those bulky swivels and pin equipped shackles and other parts which, in the past, have been invariably used for connecting of the eye splices of hoist lines to a cargo hook in this type of rigging.

Another object of the invention is to so design the equalizer, the shackles and the cargo hook, and to so attach them together, that the device as a whole is rendered foul-proof in all normal positions of use of its parts.

Still another object of the invention is to provide a type of shackle that eliminates the possibility of damage to the boom block by reason of the ports becoming wedged together.

Further objects of the invention are to be found in the present pinless shackles that make possible the shortening of the length of the block assembly; the easy and ready disconnection of cables or lines from the assembly and which insure against the flattening or wearing of the eye splices where they engage in the shackle seat.

Still further objects of the invention reside in the details of the various parts, in their combination, relationship and mode of use as will hereinafter be fully described.

In accomplishing these and other objects of the invention, I have provided the improved details of construction, the preferred forms of which are illustrated in the accompanying drawings, wherein—

Fig. 1 is a side view of the present hook and shackle assembly as embodied in the present invention.

Fig. 2 is a sectional detail of the assembly of parts, taken on line 2—2 in Fig. 1.

Fig. 3 is a side view of the rigging, showing the close relationship of the line attaching shackles and illustrating the foul-proof character of the parts.

Fig. 4 is a sectional detail on line 4—4 in Fig. 1, showing the spacer as applied to the plate connecting bolt between the side plates of the equalizer block.

Fig. 5 is a sectional detail, similar to that of Fig. 2, illustrating compound swivels as applied for connecting the cargo hook and the two shackles to the equalizer block.

Fig. 6 is a diagram showing the manner of use of one of the cables for pulling a suspended load laterally.

Fig. 7 is a detail of one of the shackles, showing the curved formation of the cable seat and the application of an eye splice of the suspending cable thereto.

Fig. 8 is a cross section on line 8—8 in Fig. 7.

Referring more in detail to the drawings—

Before going into a detailed description of the present cargo rigging, it will be stated, for purpose of a better understanding of its advantages, that typical cargo rigging as used in the past, has several undesirable features or disadvantages. One of these is that the hoist lines, or cables, which are used to lift and swing the load to various positions, are attached to the cargo hook, directly or indirectly, by means of swivels, and shackles employing screw threaded shackle pins. These parts are of such design and dimensions that they not only cause excessive wear and breakage of cables, and add materially to the weight and over-all length of the hook assembly, but present undesirable limitations in use, and there are projecting pin ends, bolts and nuts that easily become fouled in blocks on hatch coamings, or the like, resulting in the hanging up of equipment with loss of time, and increasing the danger of injury to workmen. The use of screw threaded pins in shackles is a very material disadvantage, not only because of their wear on cables, and loss of time in the removing of the shackle pins every time a cable is to be temporarily detached, but because of the added weight, added length and bulkiness of rigging, and the fact that shackles will become fouled in the boom blocks if lifted too high. Thus, it has been an object of this invention to facilitate the handling of cargo through the provision of a rigging from which the causes of these disadvantages and undesirable features have been eliminated.

The present invention contemplates use, as in the past, of two hoisting lines or cables, to be connected to a cargo hook through the mediacy of an equalizer block that is equipped with the present novel form of shackles. In the drawings, the two hoisting cables which would extend from the usual winding drums, or equivalent power devices, are designated, respectively, by reference numerals 1 and 1a, and the equalizer block through which they are connected to the cargo hook, is designated in its entirety by numeral 3. The cargo hook is designated by numeral 4 and the two shackles, whereby the cables are attached to the equalizer block, are designated by reference numerals 5 and 5a; the cables being equipped at their ends with loops or eye splices, 1' and 1", which are removably applied to the shackles, as will presently be fully explained.

In its present preferred form of construction, the equalizer block 3 comprises opposite face plates 3a and 3b, joined solidly in spaced, parallel relationship by three bolts 6. These bolts are applied through holes in the plates and through tubular spacers 7, see Fig. 4, located between the plates. As observed in Fig. 1, the bolts are located, one at the top center of the block and the other two are at opposite sides of the vertical center and somewhat below the level of the horizontal center. All bolts are drawn tight by means of nuts 6' applied to their ends, and these nuts, as well as the bolt heads, are set down within sockets in the faces of the plates, thus to prevent any possible fouling of rigging by these parts.

The cargo hook, designated in its entirety by numeral 4, is suspended from the central, lower portion of the equalizer block, by means of a swivel block 10. This is located between the spaced plates 3a and 3b and is equipped at its ends with alined trunnions 11—11 which are pivotally contained in holes 12—12 in the plates.

The hook 4 has a body, or shank portion of special design, forming a downwardly directed hooked portion, and terminating at its upper end in a rather heavily formed, horizontally directed base 13, that overlies the hook seat 14. The mouth to the hook seat opens laterally and the hook seat, as noted in Fig. 1, is rather deep and of such width as to conveniently receive and hold several lines therein.

The base 13 of the hook body is formed with a circular opening 15 in direct axial alinement with the hook seat to give proper balance and insure against undue breaking strains when weight is lifted by the hook, and rotatably fitted in this opening is the swivel shank 16 depending from the block 10. On the lower end of the shank 16, a nut 17 is threaded and is also welded, as at 17'; this nut being contained in an enlarged or counter-bored portion 15x of the passage 15, and it seats against a washer 18 which, in turn, seats against the base of the counter-bore. The lower face of the nut and lower end of the shank 16 lie in a plane flush with or substantially even with that under surface of the hook base that is adjacent the mouth of the hook, and do not in any way restrict the entrance to the hook seat.

In that type of compound swivel connection for the cargo hook that is shown in Fig. 5, the shank 16, in lieu of being integral with the block 10, is swiveled at its upper end in a hole 20 through the block and has a nut 22 threaded and welded on the upper end of the swivel shank. Also, a washer 23 is here interposed between the upper face of the block 10 and the under face of the nut 22.

Each of the two suspending or connecting shackles 5 and 5a are like the other in size and shape. Each is in the nature of a hook formed with a base portion 25, a hook shank 26 forming a hook seat 27 and a laterally opening mouth 28 leading to the hook seat. At the hook end of the shank, is a flattened and enlarged head 29 for retaining the cable eye splice or loop about the seat.

Describing the shackle more in detail, it is shown in Fig. 2 that the base portion has a hole 30 therethrough directed toward the cable seat. The outer end of a swivel shank 31 is contained pivotally in this hole and a nut 32 is threaded and welded on the shank to retain the shackle and it is shown also that the nut 32 is contained in an enlarged portion or countersink 33 so as not to obstruct entrance to the hook seat. A washer 34 is disposed between the nut and base of the counter-sink.

At its inner end, the swivel shank 31 is integral with a block 35 located between the plates 3a and 3b and this block has trunnions 36—36 at its ends that are pivotally contained in holes 37 in the plates.

The sectional detail, Fig. 5, of the alternative type, shows a compound swivel arrangement wherein the shank 31x is extended through hole 38 in block 35' and is held by nuts 39 threaded and welded thereon.

The two shackles are similarly mounted and the connections with the equalizer block are symmetrically spaced at opposite sides of the vertical center and are near the top edge of the block.

Preferably the central portions of the plates are removed in order to lessen the weight as much as possible.

A very important detail of the shackle construction resides in the formation of the cable seat, and its relationship to the axial line of the swivel shank which mounts the shackle. First, the curvature of the seat in the plane of the hook, is such as to conform to the diameter of the cable to be applied thereto. This is illustrated best in Fig. 7, wherein one of the cable loops or eye splices is shown in cross section at the base of the seat. Similarly curved channels continue around opposite sides of the shank and about its outer surface, and in these, the side portions of the eye splice will be seated when lifting strain is applied. The curvature of the cable seat, as shown in cross section in Fig. 8, is not sufficiently sharp to cause any kinking or sharp bending and will permit the cable loop to turn thereon.

In the use of the hook, with the cable loop seated, as in Fig. 8, the loop is retained in place by the head 29, which is flattened and is crosswise of the seat and of such dimensions as to project just outside the limits of the cable loop where it engages in the hook seat. As noted in Fig. 3, the loop or eye splice lies against the inner face of the head 29. Also, the head lies in a plane substantially alined with the edge of the base 25. When the two shackles are turned to the position of Fig. 3, they open toward each other, and the heads can come together.

It is to be observed also that the edge lines of curvature of the block, the hook and the shackles are such that there are no corners, projections or other irregularities in which the equipment might be caused to foul or be hung up.

It is desirable that when a load is being lifted or lowered, the two swivels be rotated to positions at which they face each other, as in Fig. 3. Then there is no chance of any line being caught in the swivel mouth. To insure this turning toward each other, the swivel seat is set just slightly outside the axial line of the swivel shank. This is illustrated in Fig. 7, wherein the lines X and Y, respectively, represent the axial line of the swivel shank, and the center line of the swivel seat. With this provision, the swivels when free will turn to positions facing each other.

It often happens in the handling of cargo that it is desirable to temporarily detach one of the hoist lines and to extend it over a pulley at one side, then to attach it to the block for lateral pulling of a load, such an arrangement being shown in Fig. 6. When the screw pin type of shackle is used, this operation takes some time, but in this instance, it is only necessary to slacken off on one line, then to slip the loop from the shackle head. Likewise, it can be quickly applied to the shackle.

Cargo rigging as described, can be made to handle various loads and it can employ either the single or compound swivels. The block and hook assembly shown and described is now replacing the old standard type of equipment because of its reduced dimensions, reduced weight, foul proof character and the extremely free swiveling action of hooks and shackles.

Having thus described my invention, what I claim as new therein and desire to secure by Letters Patent is—

1. In a cargo handling rigging, in combination, two hoisting cables, each equipped at its end with an eye loop, an equalizer block, a pair of shackle hooks with base ends swivelly fixed in the block, at its top and having hook-like outer end portions applied to said cable loops and a cargo hook suspended from the bottom portion of the block.

2. A combination as recited in claim 1 wherein the hook-like outer end portion of each shackle forms a rounded cable seat against which the loop end of the corresponding cable engages; and wherein an enlargement is formed at the end of the hook shank to retain the cable loop from disconnection with the shackle while the cable is under lifting strain.

3. In a cargo handling rigging, in combination, two hoisting cables, each equipped at its end with an eye loop, an equalizer block, a pair of shackles with base ends swivelly fixed in the block at the top thereof and at opposite sides of the vertical center line, each shackle having its outer end portion formed with a hook that is applied through the eye loop of one of said cables, and a cargo hook having its base end swivelly fixed in the block at its lower edge between the vertical lines through the shackles.

4. A combination as recited in claim 3, wherein the hook portion of each shackle is formed with a rounded cable seat conforming substantially in curvature to the cross sectional curvature of the cable; and there being a flattened head portion at the end of the hook shank over which the cable eye loop may be passed, when the cable is slack, for connection and disconnection of the cable, and against which the eye loop will flatly engage to retain it from disconnection with the shackle when the cable is taut.

5. In a cargo handling rigging, in combination, two hoisting cables, each equipped at its end with an eye loop, an equalizer block, a pair of shackles fixed in the block at its top edge and in spaced relationship, a cargo hook swivelly suspended from the equalizer block at its bottom edge symmetrically between the points of attachment of the shackles; each of said shackles having a base portion, and there being swivel bolts pivotally mounted in the block and extended through the base portions of the said swivels; each of the swivels being formed at its outer end with a hook-like portion applied through a cable eye loop and formed with a cable seat against which the loop engages, and a flattened head at the end of the hook against which the loop flatly engages to retain it in the seat when under lifting strain.

6. A cargo handling rigging device comprising an equalizer block, a pair of shackles connected with the upper end of the block in spaced relationship, and a cargo hook swivelly suspended from the block at its lower end and between the points of connection of the shackles; each shackle having a base portion and there being a swivel bolt therefor pivotally fixed in the block and extended through the base portion of the shackle for its free swiveling action thereon, and there being a hook on the outer end of the shackle for its connection with a hoisting cable; said cargo hook having a base portion and there being a bolt having one end swivelly fixed in the said base portion and its other end pivotally fixed in the block.

OSCAR A. WIRKKALA.